(12) United States Patent
Torres et al.

(10) Patent No.: US 10,495,254 B2
(45) Date of Patent: Dec. 3, 2019

(54) LATCH WITH MAGNETICALLY-ASSISTED OPERATION FOR INFORMATION HANDLING SYSTEMS (IHSS)

(71) Applicant: Dell Products, L.P., Round Rock, TX (US)

(72) Inventors: Christopher A. Torres, San Marcos, TX (US); Timothy M. Radloff, Austin, TX (US); Jason Scott Morrison, Cedar Park, TX (US); Weijong Sheu, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 101 days.

(21) Appl. No.: 15/730,166

(22) Filed: Oct. 11, 2017

(65) Prior Publication Data

US 2019/0107245 A1 Apr. 11, 2019

(51) Int. Cl.
*F16M 13/00* (2006.01)
*G06F 1/16* (2006.01)
*F16M 11/10* (2006.01)
*F16B 1/00* (2006.01)

(52) U.S. Cl.
CPC .......... *F16M 13/005* (2013.01); *F16M 11/10* (2013.01); *G06F 1/166* (2013.01); *G06F 1/1616* (2013.01); *G06F 1/1679* (2013.01); *F16B 2001/0035* (2013.01)

(58) Field of Classification Search
CPC . F16B 1/00; F16B 2001/0035; F16M 11/041; F16M 11/18; F16M 13/00; F16M 11/10; F16M 13/05; F16M 13/005; G06F 1/166; G06F 1/16; G06F 1/1616; H01F 7/0205

See application file for complete search history.

(56) References Cited

U.S. PATENT DOCUMENTS

| | | | | |
|---|---|---|---|---|
| 6,891,722 B2 * | 5/2005 | Chen | ..................... | E05B 63/248 335/207 |
| 7,050,295 B2 * | 5/2006 | Kang | ..................... | E05B 63/24 292/137 |

(Continued)

FOREIGN PATENT DOCUMENTS

TW M368279 U 11/2009

*Primary Examiner* — Dimary S Lopez Cruz
*Assistant Examiner* — Ingrid D Wright
(74) *Attorney, Agent, or Firm* — Fogarty LLP

(57) ABSTRACT

A latch with magnetically-assisted operation is described. In some embodiments, a latch may include: a first magnetic device fixedly coupled to a first portion of an Information Handling System (IHS); a second magnetic device coupled to a second movable portion of the IHS; and a carrier, comprising: a compression bracket fixedly coupled to the first portion of the IHS, the compression bracket having a slot configured to accommodate the second magnetic device, at least one guidepost configured to receive a return spring, and at least one stopping pin; and a actuator bracket movably coupled to compression bracket, the actuator bracket having a button configured to translate the second magnetic device with respect to the first magnetic device, at least one orifice configured to engage with the at least one guidepost, and at least one detent configured to engage with the at least one stopping pin.

19 Claims, 7 Drawing Sheets

(56) References Cited

U.S. PATENT DOCUMENTS

| | | | |
|---|---|---|---|
| 7,216,900 B2* | 5/2007 | Liu | E05C 3/162 |
| | | | 292/111 |
| 9,671,830 B2 | 6/2017 | Chen et al. | |
| 2007/0138806 A1* | 6/2007 | Ligtenberg | E05C 19/16 |
| | | | 292/251.5 |
| 2016/0106190 A1* | 4/2016 | Song | A45C 11/00 |
| | | | 361/679.3 |
| 2016/0230924 A1* | 8/2016 | Chen | F16M 13/005 |

* cited by examiner

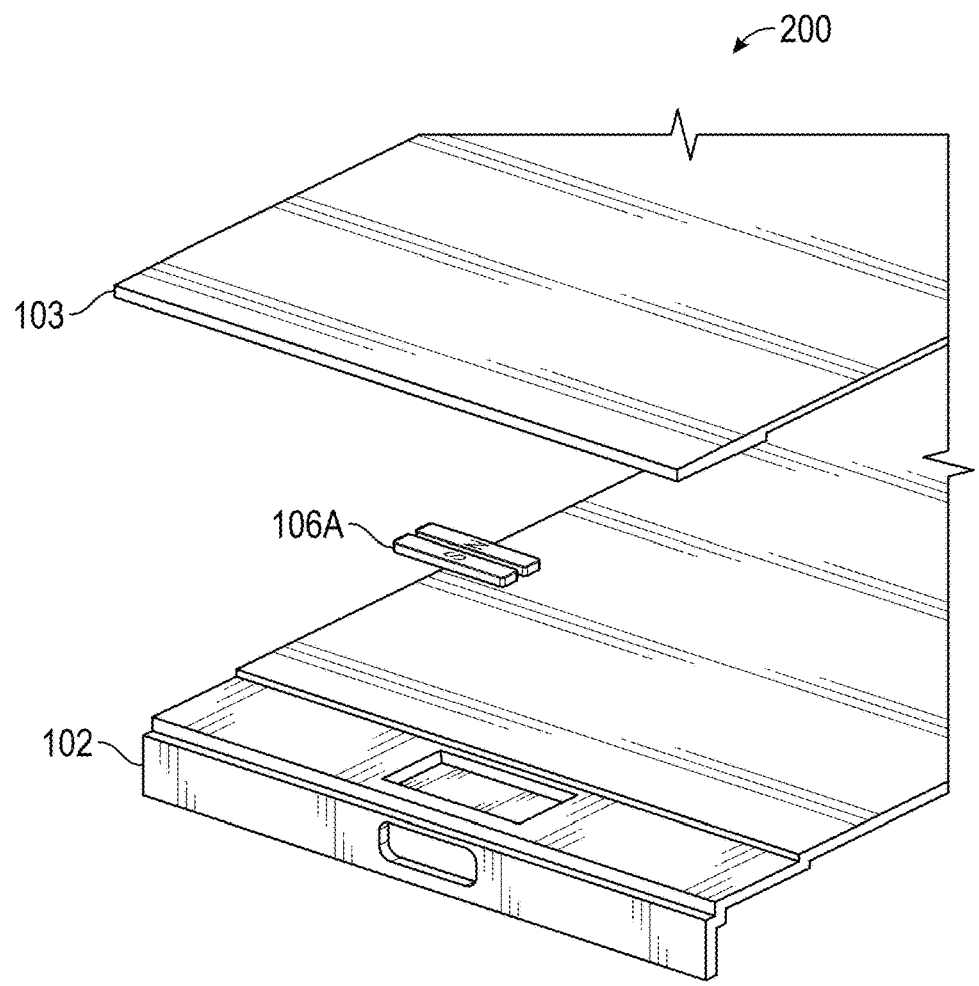
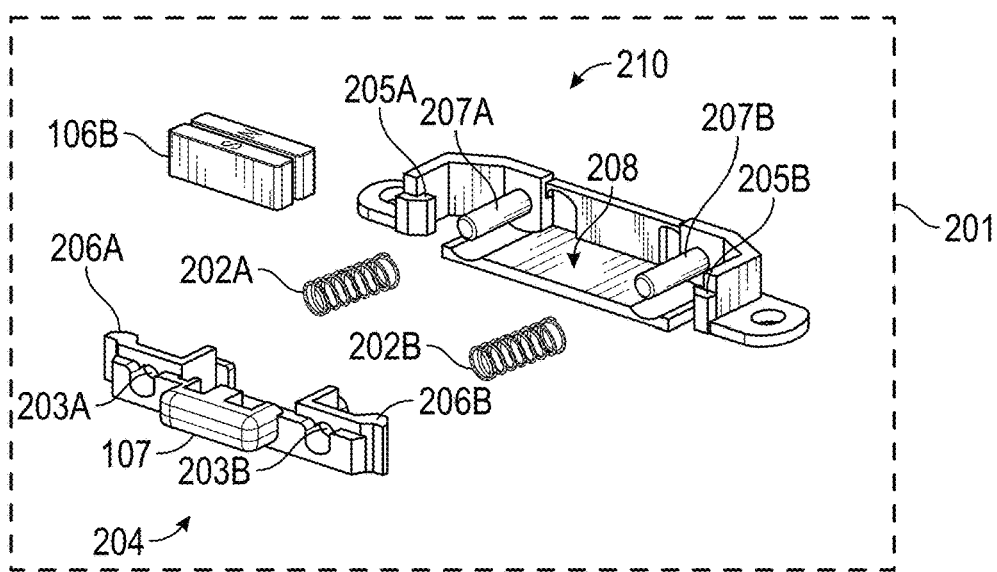
FIG. 2

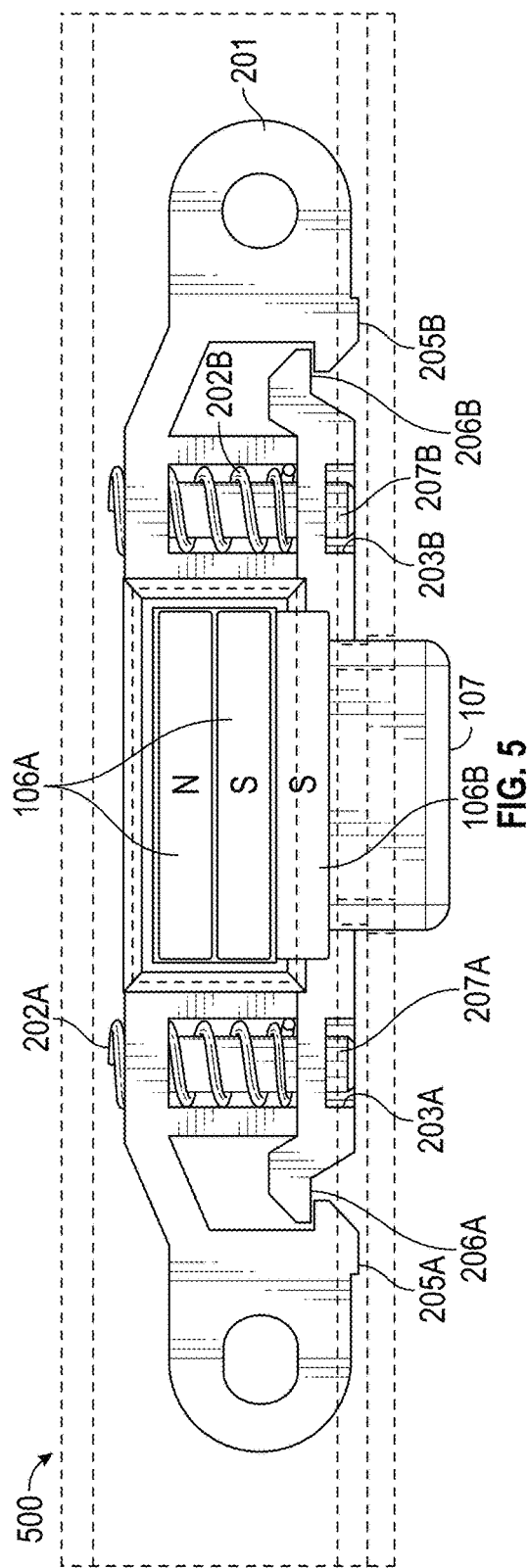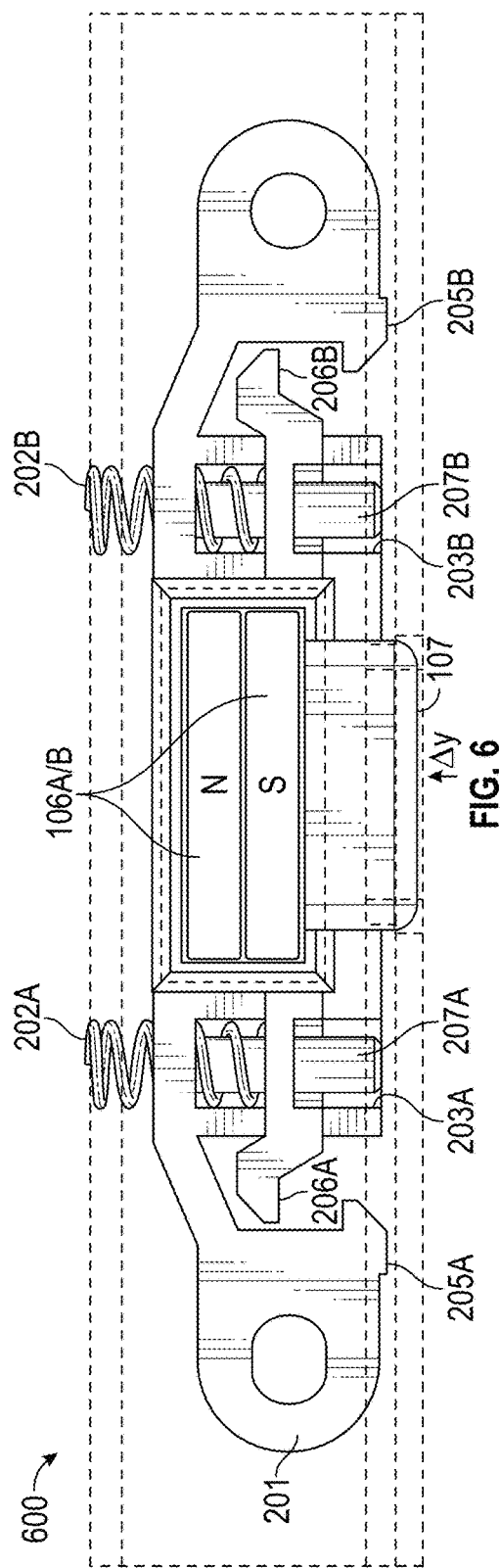

LATCH WITH MAGNETICALLY-ASSISTED OPERATION FOR INFORMATION HANDLING SYSTEMS (IHSS)

FIELD

The present disclosure generally relates to information handling systems, and, more particularly, to a latch with magnetically-assisted operation for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In various implementations, an information handling system may include a "kickstand" or the like. In general terms, a kickstand is an accessory or device that supports or otherwise props up an information handling system, so a user does not generally have to hold the device during its operation. In many cases, a kickstand may be a stand-alone product, a distinct product (e.g., a protective case), or integral part of the information handling system's chassis.

With respect to kickstands, the inventors hereof have determined that it would be desirable, for example, to deploy a spring-loaded kickstand that remains in a stowed or closed position when not in use, that allows a user to automatically deploy or open the kickstand when needed, and/or that allows the user to manually trigger the kickstand without damage. To address these, and other issues, the inventors hereof have developed latches that operate with magnetic assistance, as described herein.

SUMMARY

Embodiments of a latch with magnetically-assisted operation are described. In an illustrative, non-limiting embodiment, a latch may include: a first magnetic device fixedly coupled to a first portion of an Information Handling System (IHS); a second magnetic device coupled to a movable second portion of the IHS; and a carrier, comprising: a compression bracket fixedly coupled to the first portion of the IHS, the compression bracket having a slot configured to accommodate the second magnetic device, at least one guidepost configured to receive a return spring, and at least one stopping pin; and a actuator bracket coupled to a movable compression bracket, the actuator bracket having a button configured to translate the second magnetic device with respect to the first magnetic device, at least one orifice configured to engage with the at least one guidepost, and at least one detent configured to engage with the at least one stopping pin.

In some implementations, the first magnetic device and the second magnetic device may have a same polarity orientation along a common axis. The first magnetic device may translate along the common axis in response to operation of the button.

When the actuator bracket is in a first position, the first magnetic device and the second magnetic device may interact under a predominantly attractive force. For example, when the actuator bracket is in the first position, a first portion of the first magnetic device having a first polarity may be aligned in a direction perpendicular to the common axis with a first portion of the second magnetic device having a second polarity opposite the first polarity.

When the actuator bracket is in a second position, the first magnetic device and the second magnetic device may interact under a predominantly repulsive force. For example, when the actuator bracket is in the second position: (i) a first portion of the first magnetic device having a first polarity may be aligned in a direction perpendicular to the common axis with a second portion of the second magnetic device having a second polarity opposite the first polarity, and (ii) a second portion of the first magnetic device having the second polarity may be aligned in the direction perpendicular to the common axis with a first portion of the second magnetic device having the first polarity.

In some cases, the second portion of the IHS may include a kickstand. The actuator bracket may be operated in response to physical contact of the actuator with a surface perpendicular to the first portion.

The second portion of the IHS may be coupled to the first portion via a spring-loaded hinge. The first portion of the IHS may include one or more clamping magnets, and the second portion of the IHS may include a corresponding set of one or more clamping magnets.

When the first magnetic device is in a first position along the common axis, forces applied to the second portion by the spring-loaded hinge may be smaller than a sum of: (i) attractive forces between the first and second magnetic devices, and (ii) attractive forces between the clamping magnets. When the first magnetic device is in a second position along the common axis, the attractive forces between the clamping magnets may be equal to a sum of: (i) the forces applied to the second portion by the spring-loaded hinge, and (ii) repulsive forces between the first and second magnetic devices. Wherein when the first magnetic device is in a third position along the common axis, the attractive forces between the clamping magnets may be smaller than a sum of: (i) repulsive forces between the first and second magnetic devices, and (ii) the forces applied to the second portion by the spring-loaded hinge.

In some cases, the second distance may be zero. At least one of the first or second magnetic devices includes an electromagnetic coil.

In another illustrative, non-limiting embodiment, a carrier may include an actuator bracket having a button configured to translate a second magnet movably coupled to an IHS with respect to a first magnetic device fixedly coupled to a kickstand, where the actuator bracket further includes: at an orifice configured to engage with a guidepost, and a detent configured to engage with a stopping pin; and a compression bracket fixedly coupled to the IHS, wherein the compression bracket further includes: a slot configured to accommodate the second magnet, the guidepost, and the stopping pin, wherein the guidepost is configured to receive a return spring.

In yet another illustrative, non-limiting embodiment, a method may include operating an actuator of a carrier coupled to a chassis of an IHS, where the carrier holds a first magnet that is movable relative to the chassis by operation of the actuator; and supporting at least a portion of the IHS using a kickstand coupled to the chassis, wherein the kickstand holds a second magnet fixed relative to the kickstand.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 2 is an exploded view of latch components and magnet carrier, according to some embodiments.

FIGS. 5 and 6 are top views of the assembled latch components in a home configuration and in a depressed configuration, respectively, according to some embodiments.

DETAILED DESCRIPTION

Embodiments described herein comprise a latch with magnetically-assisted operation. In various implementations, systems and methods to concealably retain a spring loaded kickstand using multiple sets of magnets and latch mechanisms are provided. A user actuates the latch mechanism causing the kickstand and latch magnet's polarity to match, thus generating a repelling force that allows the kickstand to automatically deploy. The user may also manually open the kickstand without damage to the system.

In some embodiments, a system may include a kickstand assembly and a chassis or housing assembly with integrated latches. Single or multiple sets of magnets may be attached to the kickstand and concealed from view. Single or multiple sets of latch mechanisms may be installed into the chassis or housing, also concealed from view. The latch may include two or more magnets that are installed with the same (or opposite) polarity orientation into a carrier with a button/foot geometry that is exposed on the outside of the assembly.

When the kickstand is stowed away, the magnetic retention force between the kickstand magnets and latch magnets (in locked position) is higher than the kickstand spring opening force, therefore locking the kickstand in position. The user may then press the system down against a surface to actuate the latch's buttons/feet. When actuated, the button/foot causes the latch magnets to shift or translate, thus causing the polarities between the kickstand and latch magnets to match. This matching polarity in turn generates a repelling force that allows the kickstand to automatically deploy.

In some cases, because the latch generates a repelling force, additional sets of magnets may be used to increase the kickstand to housing retention force, thus creating a more stable attachment (better retention when deployment is not wanted) when needed. The combination of magnets results in a balanced system when in the closed position, and in an unbalanced system when the kickstand is deployed.

In some cases, the user may manually actuate the kickstand without triggering the latch. This may be accomplished, for example, by manually pulling on one side of the kickstand to overcome the magnetic attachment.

In various embodiments, systems and methods described herein may be employed to produce a break-safe latch where the latch mechanism is not damaged if the kickstand is accidentally pulled apart. Both the kickstand magnets and latch mechanisms may be concealed in a compact design that has a minimal impact to the system's internal volume. Moreover, systems and methods described herein may also preserve the integrity of the work surface that the IHS is placed on, since it does not use exposed hooks or latches at the lower edge of the kickstand where the IHS would ordinarily sit on a table or desk (exposed hooks or latches may scratch/damage the work surface when the kickstand is deployed over larger open angles).

Figure 1:
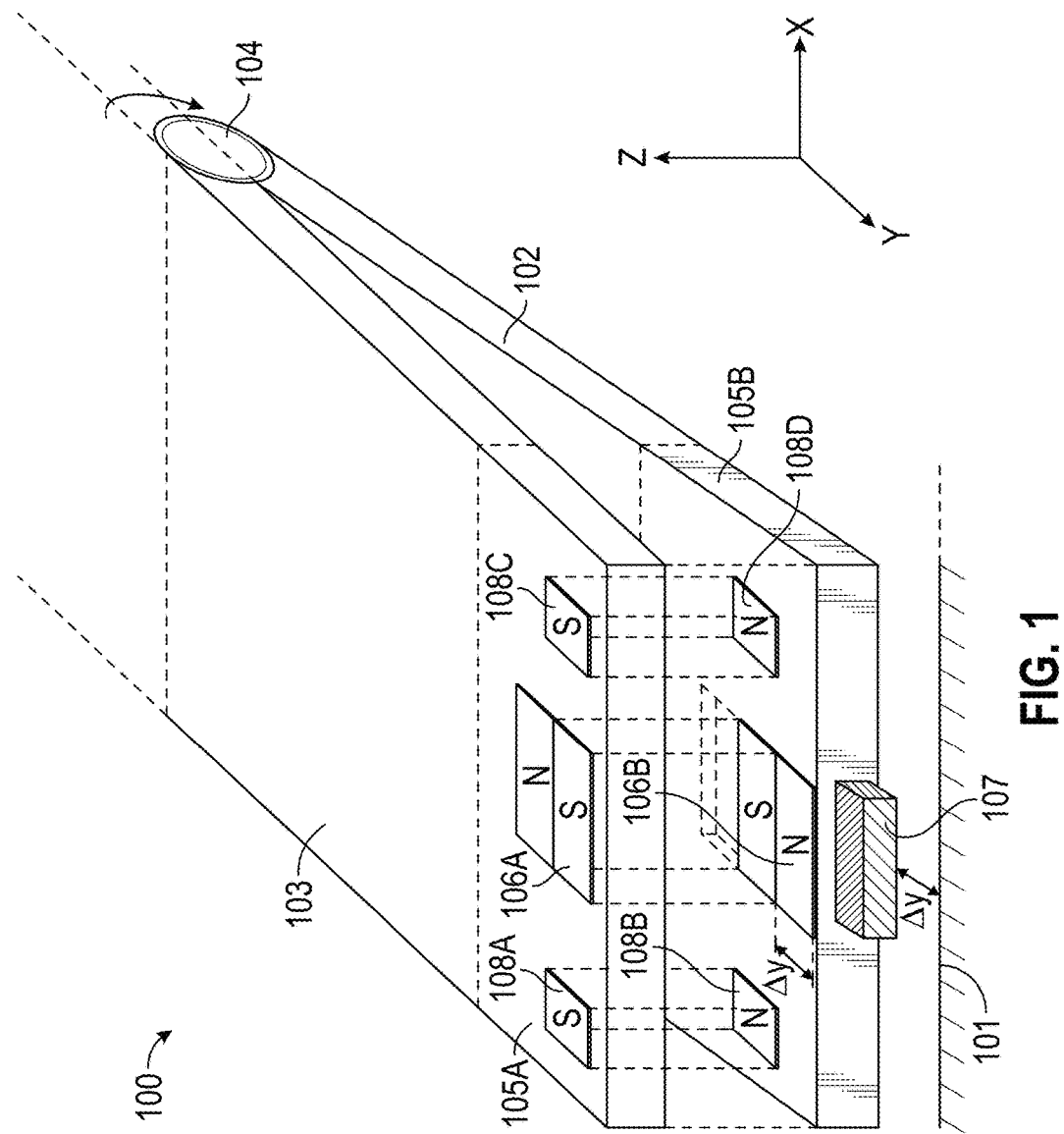
FIG. 1 is a perspective view of an example of a latch with magnetically-assisted operation according to some embodiments.

To illustrate the foregoing, FIG. 1 shows a perspective view of an example of latch 105 with magnetically-assisted operation. In some embodiments, information handling system (IHS) 100 may be disposed on horizontally (X-Y) surface 101. IHS 100 may include chassis 102 and kickstand 103. Chassis 102 includes chassis latch portion 105B and kickstand 103 includes kickstand latch portion 105A (collectively referred to as latch 105). Kickstand 103 may be coupled to chassis 102 via hinge 104, which may be a spring-loaded hinge or the like.

Magnetic devices 106A and 106B, 108A and 108B, and 108C and 108D, interact with each other (attraction and repulsion) under influence of their respective magnetic fields. In some cases, one or more of magnetic devices 106A-D may be implemented as neodymium magnets (e.g., grade "N48"), may include one or more magnets, and/or may include poly-magnets and/or programmable magnets. Moreover, in various implementations, magnet size may be adjusted to meet various IHS form factors, geometries, electrical requirements, and/or weight considerations.

As illustrated, magnetic devices 108A and 108B have opposite polarity (in this example, south or "S" and north or "N", respectively), as do magnetic devices 108C and 108D (S and N, respectively). In contrast, magnetic device 106A has a first polarity orientation in the Y direction (S-N in this case), while magnetic device 106B has an opposite polarity orientation in the Y direction (N-S).

In alternative embodiments, however, magnetic devices 106A and 106B may have the same polarity orientation in the Y axis using techniques described herein, with minor modifications that would be readily apparent to a person of ordinary skill in the art in light of this disclosure.

In various implementations, magnetic devices 108A-D ("clamping magnets") may be used to provide a larger overall clamping force when kickstand 103 is stowed or closed with respect to chassis 102. To this end, magnetic devices 108A and 108C may be fixed or stationary relative to kickstand 103. Conversely, magnetic devices 108B and 108D may also be fixed or stationary relative to chassis 102. That is, chassis 102 includes, is coupled to, and/or accommodates magnetic devices 108B and 108D.

Magnetic device 106A is also fixed or stationary with respect to kickstand 103; however, magnetic device 106B is allowed to travel in the Y direction relative to chassis 102 under control of actuator 107. Moreover, the magnitude and/or nature of the magnetic interactions between magnetic devices 106A and 106B vary over time as actuator 107 physically moves magnetic device 106B such that the position of magnetic device 106B changes relative to chassis 102, to enable magnetic-assisted operation of latch 105.

FIG. 2 is an exploded view of latch components 200 and carrier 201. As noted above, kickstand 103 includes and/or is coupled to magnetic device 106A (clamping magnets are omitted for simplicity), and chassis 102 includes, accommodates, and/or is coupled to magnetic device 106B.

In this embodiment, carrier 201 includes compression bracket 210 and actuator bracket 204. Compression bracket 210 includes first guidepost 207A, second guidepost 207B, first detent 205A, second detent 205B, and surface 208. First guidepost 207A and second guidepost 207B are configured to receive first return spring 202A and second return spring 202B, respectively. In various implementations, first return spring 202A and second return spring 202B may be coil springs with diameters and lengths larger than guideposts 207A and 207B, such that actuator bracket 204 applies an outward force against either the detents of the compression bracket or the chassis, depending on the design.

Actuator bracket 204 includes actuator 107 (e.g., a mechanical push button) first orifice 203A and second orifice 203B, first stopping pin 206A and second stopping pin 206B. In various implementations, first orifice 203A may have a diameter between the diameter of first return spring 202A and first guidepost 202A. Similarly, second orifice 203B may have a diameter between the diameter of second return spring 202B and second guidepost 202B. First and second stopping pins 206A-B have a shape configured to match the shape of detents 205A-B and to limit the amount of traveling or translation that actuator bracket 210 is allowed to have.

When compression bracket 210 is coupled to actuator bracket 204, actuator bracket 204 becomes operable to slide in and out of guideposts 207A-B when actuator 107 is pressed (e.g., directly by a user or against a surface), against opposing forces presented by return springs 202A-B. When actuator 107 is no longer pressed, return springs 202A-B cause actuator bracket 204 to return to its default position, as stopping pins 206A-B engage with detents 205A-B.

Figure 3:
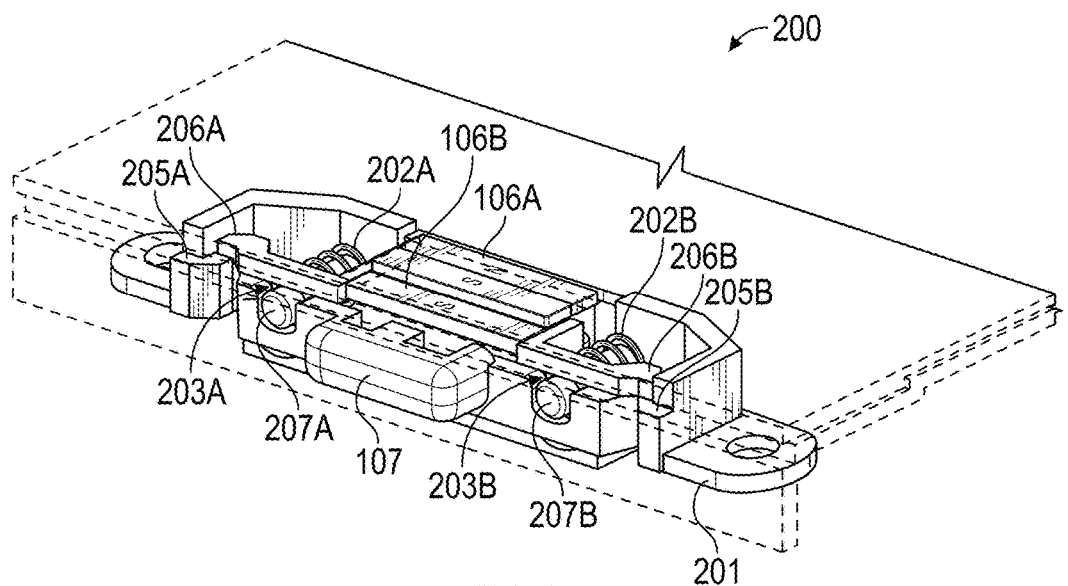
FIG. 3 is a perspective view of assembled latch components and magnet carrier, according to some embodiments.

FIG. 3 shows latch components 200 and carrier 201 in assembled form 300, according to some embodiments. Assembled components 300 include actuator 107 in its initial, "home," or "rest" position, such that magnetic devices 106A and 106B are offset from one another in the Y direction by a selected distance. As a result, a first portion of magnetic device 106A that has a given polarity (e.g., S) sits immediately above a first portion of magnetic device 106B having opposing polarity (e.g., N). A second portion of magnetic device 106A sits above a groove or channel in chassis 102 that allows magnetic device 106B to travel in the Y direction. Finally, a second portion of magnetic device 106B sits under a plain surface of kickstand 103.

Figure 4:
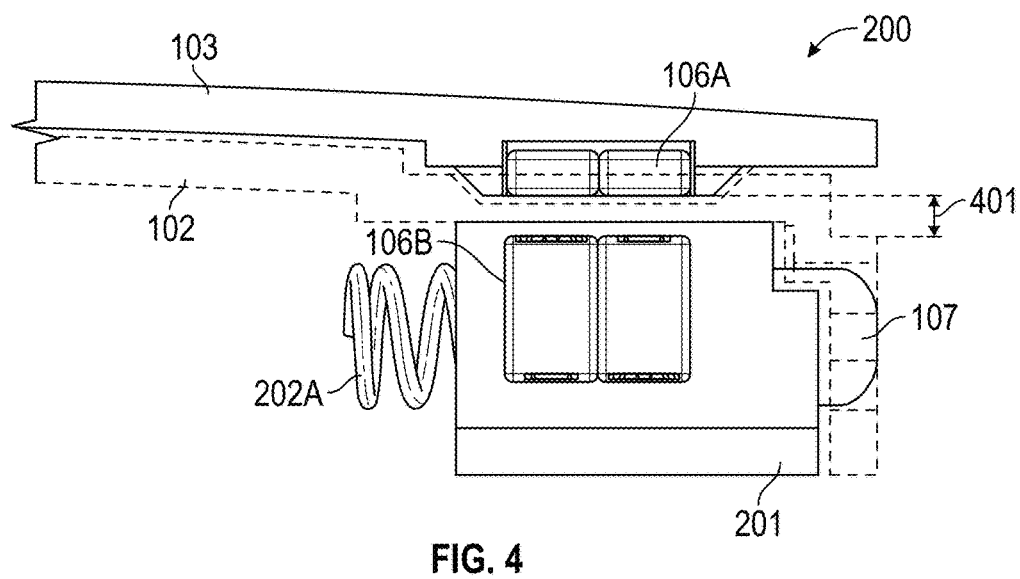
FIG. 4 is a lateral view of the assembled latch components and magnet carrier, according to some embodiments.

FIG. 4 is a lateral view of latch components 200 and carrier 201, and illustrates a gap 401 in the Z-direction between magnetic devices 106A and 106B. In some cases, gap 401 may be of the order of 0.7 mm and/or it may be adjustable (e.g., via hinge 104) to empirically adjust magnetic forces among the various magnetic devices.

FIG. 5 is a top view of assembled components 300 in home configuration 500 when kickstand 103 is either fully open or closed, in the absence of activation of actuator 107. FIG. 6 is a top view of assembled components 300 in depressed configuration 600 when kickstand 103 is activated via actuator 107. The transitions among the various different configurations are explained in more detail in FIGS. 7-9.

Broadly, magnets in the chassis attract corresponding magnets in the kickstand when in home configuration 500. Conversely, magnets in the chassis translate when a button is depressed, resulting in a repulsion force for corresponding magnets in kickstand and therefore aiding in the opening of the kickstand (e.g., easier to open, faster opening action, etc.).

Figure 7:
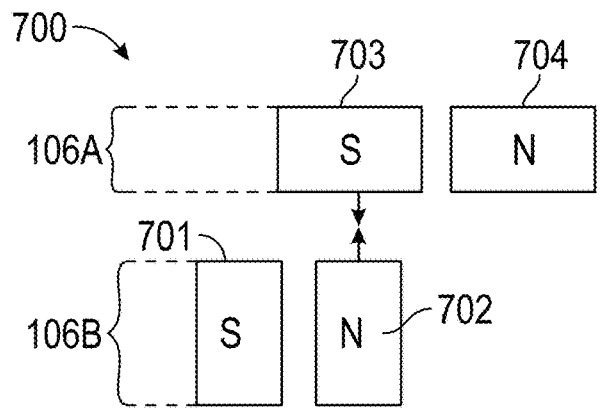
FIGS. 7-9 are block diagrams illustrating the magnetically-assisted operation of the example latch according to some embodiments.
Figure 8:
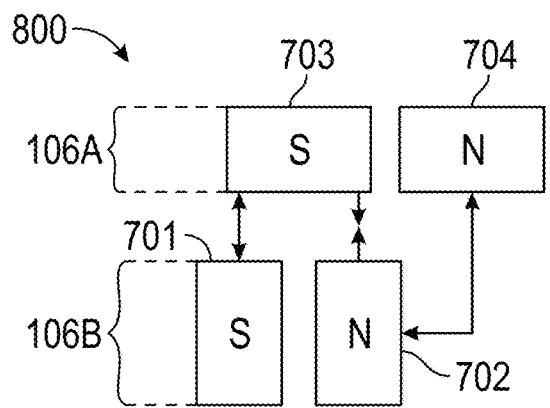
Figure 9:
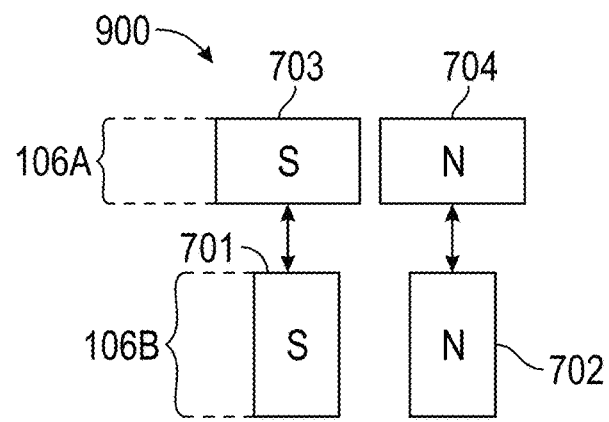

FIGS. 7-9 are block diagrams illustrating the magnetically-assisted operation of latch 105 according to some embodiments. Particularly, stage 700 corresponds to home configuration 500 and stage 900 corresponds to depressed configuration 600. Stage 800 is an intermediate stage reached during operation of latch 105 as it opens to deploy kickstand 103.

In stage 700, portion 701 of magnetic device 106B sits below a plain portion of kickstand 103, portion 702 of magnetic device 106B sits below portion 703 of magnetic device 106A, and portion 704 of magnetic device 106A sits above a plain portion of chassis 102. The dominant force in this configuration is an attractive force between portions 702 and 703, which operates to maintain kickstand 103 closed (alongside forces provided by any clamping magnets 108A-D) against repelling forces between portions 701 and 703, and between 702 and 704 (alongside forces provided by spring-loaded hinge 104).

Stage 800 is reached in response to actuator 107 being activated to cause magnetic device 106B to translate in the Y direction with respect to magnetic device 106A. In this state of unstable equilibrium, a balance is reached such that: the attractive force between portions 702 and 703 (in conjunction with any clamping magnets 108A-D) is approximately equal in magnitude to an opposing force that is the sum of: (a) repelling forces between portions 701 and 703, and (b) repelling forces between 702 and 704 (in conjunction with any forces applied by spring-loaded hinge 104).

In stage 900, actuator 107 is at is maximum travel distance, such that magnetic device 106A is immediately above magnetic device 106B. In this state, repelling forces between portions 701 and 703, and between 702 and 704 (in conjunction with any forces applied by spring-loaded hinge 104) dominate any attractive forces between portions 701 and 704, or between portions 702 and 703 (in conjunction with any forces applied by clamping magnets 108A-D).

Still referring to FIGS. 7-9, it should be noted that, in many cases, the opening of kickstand 103 begins to take place immediately after stage 800, when gap 401 begins to increase. Hence, in these cases, stage 900 may not be reached and/or it may not be necessary to provide opening assistance of kickstand 103.

Figure 10:
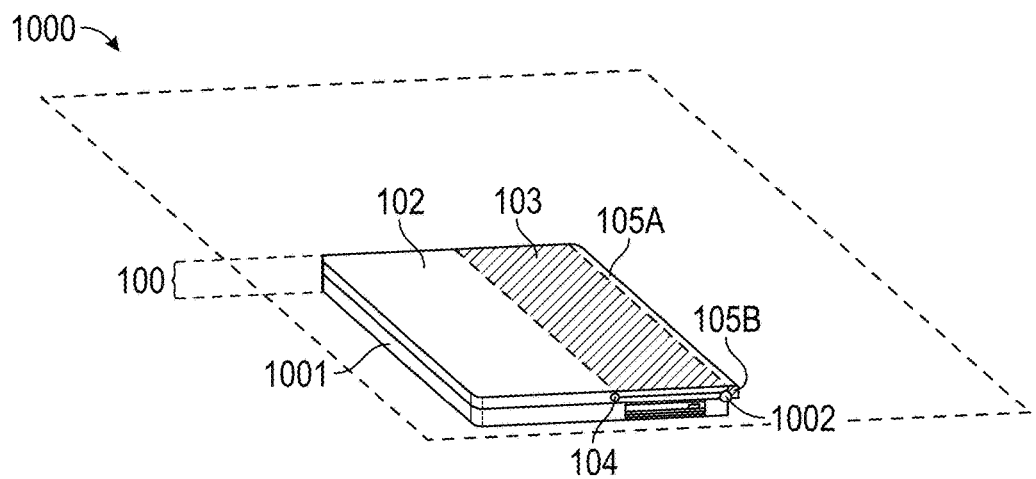
FIGS. 10-12 are perspective views illustrating an example application of the latch in an information handling system (IHS) to some embodiments.
Figure 11:
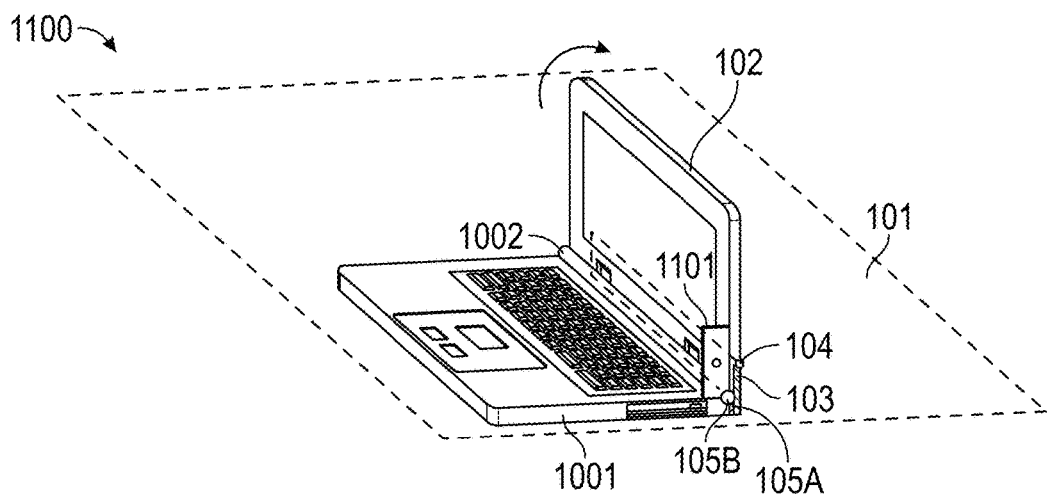
Figure 12:
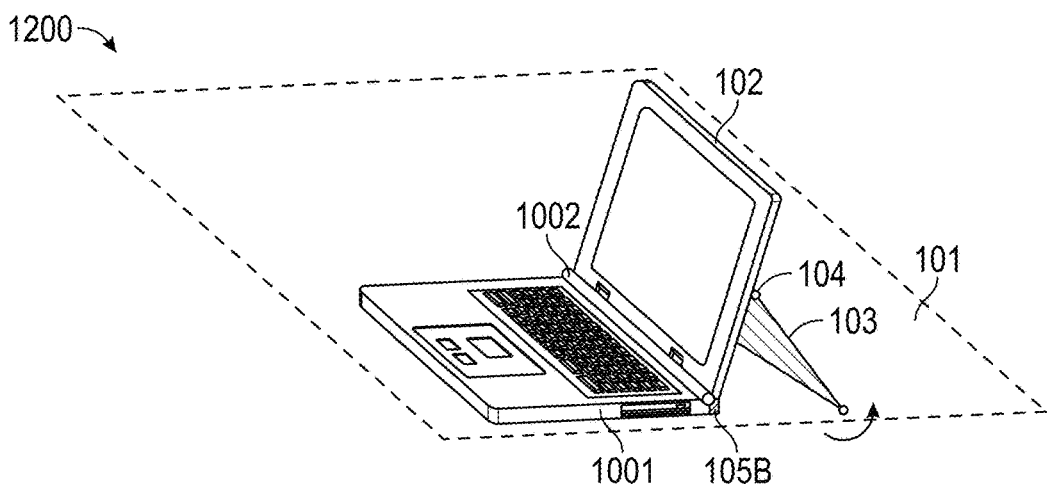

FIGS. 10-12 are perspective views illustrating an application of latch 105 in IHS 100 to some embodiments. In this example, IHS 100 is integrated into a laptop or tablet device having IHS portion 1001 coupled to chassis or lid 102, for instance, via coupler 1002 (e.g. a hinge with guideposts and/or electrical terminals, such as pogo pins or the like).

In some cases, IHS portion 1001 may include a processor and/or other IHS components, whereas chassis 200 may house a liquid crystal display (LED) or the like. In other cases, IHS portion 1001 may be a keyboard or docking station, and chassis 200 may house a touch screen or tablet device.

As previously discussed, chassis 102 may be coupled to kickstand 103 via spring-loaded hinge 104. Kickstand 103 may include kickstand latch portion 105A and chassis 102 may include chassis latch portion 105B.

When in state 1000, IHS portion 1001 sits closed horizontally on surface 101. Then, in state 1100, a user manipulates and opens chassis 102 away from IHS portion 1001 around coupler 1002 such that the rear portion of latch 105B touches surface 101 and therefore begins to activate actuator 107 (at any selected activation angle 1101—e.g., 90°). In state 1200, as actuator 107 becomes depressed against surface 101, magnetic device 106B translates with respect to magnetic device 106A, thus magnetically assisting in the opening of kickstand 103. Once opened, kickstand 103 helps to support IHS 100 against surface 101.

In some embodiments, the size, number, and position of the various components described herein may be selected empirically without undue experimentation. For example, in some cases, the following specifications may be used to manufacture the aforementioned systems: magnet material=N42; magnet size=2 mm×12 mm×1 mm on the kickstand side and 2 mm×12 mm×3.2 mm on the chassis side; magnet quantity (kickstand)=2; magnet quantity (chassis)=2; Z-gap or distance=0.7 mm; holding force per latch=99 gf; total holding force=198 gf.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 13:
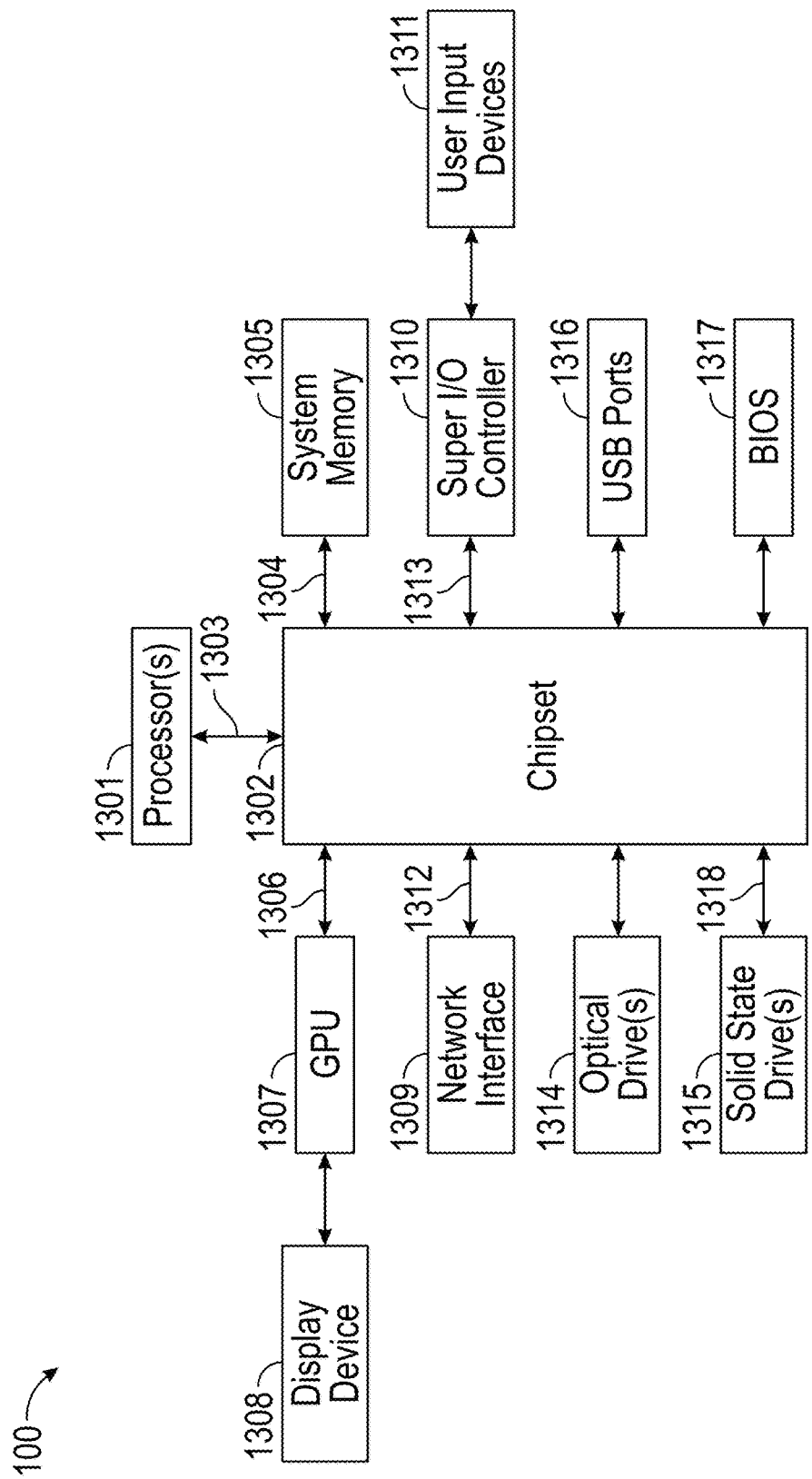
FIG. 13 is a block diagram illustrating example components of the IHS according to some embodiments.

FIG. 13 illustrates example components of IHS 100 according to some embodiments. As shown, IHS 100 includes one or more processors 1301. In various embodiments, IHS 100 may be a single-processor system including one processor 1301, or a multi-processor system including two or more processors 1301. Processor(s) 1301 may include any processor capable of executing program instructions, such as any general-purpose or embedded processor implementing any of a variety of Instruction Set Architectures (ISAs).

IHS 100 comprises chipset 1302 that may include one or more integrated circuits that are connected to processor(s) 1301. In certain embodiments, chipset 1302 may utilize QPI (QuickPath Interconnect) bus 1303 for communicating with the processor(s) 1301. Chipset 1302 provides processor(s) 1301 with access to a variety of resources. For instance, chipset 1302 provides access to system memory 1305 over memory bus 1304. System memory 1305 may be configured to store program instructions and/or data accessible by processors(s) 1301. In various embodiments, system memory 1305 may be implemented using any suitable memory technology, such as static RAM (SRAM), dynamic RAM (DRAM) or nonvolatile/Flash-type memory.

Chipset 1302 may also provide access to Graphics Processing Unit (GPU) 1307. In certain embodiments, graphics processor 1307 may part of one or more video or graphics cards that have been installed as components of IHS 100. Graphics processor 1307 may be coupled to the chipset 1302 via graphics bus 1306 such as provided by an AGP (Accelerated Graphics Port) bus or a PCIe (Peripheral Component Interconnect Express) bus. In certain embodiments, GPU 1307 generates display signals and provides them to display device 1308.

In certain embodiments, chipset 1302 may also provide access to one or more user input devices 1311. In such embodiments, chipset 1302 may be coupled to a super I/O controller 1310 that provides interfaces for a variety of user input devices 1311, in particular lower bandwidth and low data rate devices.

For instance, super I/O controller 1310 may provide access to a keyboard and mouse or other peripheral input devices. In certain embodiments, super I/O controller 1310 may be used to interface with coupled user input devices 1311 such as keypads, biometric scanning devices, and voice or optical recognition devices. These I/O devices may interface with super I/O controller 1310 through wired or wireless connections. In certain embodiments, chipset 1302 may be coupled to super I/O controller 1310 via Low Pin Count (LPC) bus 1313.

Other resources may also be coupled to processor(s) 1301 of IHS 100 through chipset 1302. In certain embodiments, chipset 1302 may be coupled to a network interface 1309, such as provided by a Network Interface Controller (NIC) that is coupled to IHS 100. In certain embodiments, network interface 1309 may be coupled to chipset 1302 via PCIe bus 1312. According to various embodiments, network interface 1309 may also support communication over various wired and/or wireless networks and protocols (e.g., Wi-Fi, Bluetooth, etc.). In certain embodiments, chipset 1302 may also provide access to one or more Universal Serial Bus (USB) ports 1316.

Chipset 1302 also provides access to one or more solid state storage devices 1315 using PCIe bus interface connection 1318. In certain embodiments, chipset 1302 may also provide access to other types of storage devices. For instance, in addition to solid state storage device 1315, IHS 100 may also utilize one or more magnetic disk storage devices, or other types of the storage devices such as optical drive(s) 1314 or a removable-media drive. In various embodiments, solid state storage device 1315 may be integral to IHS 100, or may be located remotely from IHS 100.

Upon powering or restarting IHS 100, processor(s) 1301 may utilize instructions stored in Basic Input/Output System (BIOS) or Unified Extensible Firmware Interface (UEFI) chip 1317 to initialize and test hardware components coupled to IHS 100 and to load an Operating System (OS) for use by IHS 100. Generally, BIOS 1317 provides an abstraction layer that allows the OS to interface with certain hardware components that utilized by IHS 100. It is through this hardware abstraction layer that software executed by the processor(s) 1301 of IHS 100 is able to interface with I/O devices that coupled to IHS 100.

In various embodiments, IHS 100 may not include each of the components shown in FIG. 13. Additionally or alternatively, IHS 100 may include various components in addition to those that are shown. Furthermore, some components that are represented as separately may, in other embodiments, be integrated with other components. For example, in various implementations, all or a portion of the functionality provided by the illustrated components may instead be provided by components integrated into the one or more processor(s) 1301 as a system-on-a-chip (SOC) or the like.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A latch, comprising:
a first magnetic device fixedly coupled to a first portion of an Information Handling System (IHS);
a second magnetic device coupled to a movable second portion of the IHS; and
a carrier, comprising:
a compression bracket fixedly coupled to the first portion of the IHS, the compression bracket having a surface configured to accommodate the second magnetic device, at least one guidepost configured to receive a return spring, and at least one stopping pin; and
an actuator bracket coupled to the compression bracket, the actuator bracket having a button configured to translate the second magnetic device with respect to the first magnetic device, at least one orifice configured to engage with the at least one guidepost, and at least one detent configured to engage with the at least one stopping pin.

2. The latch of claim 1, wherein the first magnetic device and the second magnetic device have a same polarity orientation.

3. The latch of claim 1, wherein the first magnetic device translates in response to operation of the button.

4. The latch of claim 3, wherein when the actuator bracket is in a first position, the first magnetic device and the second magnetic device interact under a predominantly attractive force.

5. The latch of claim 4, wherein when the actuator bracket is in the first position, a first portion of the first magnetic device having a first polarity is aligned with a first portion of the second magnetic device having a second polarity opposite the first polarity.

6. The latch of claim 4, wherein when the actuator bracket is in a second position, the first magnetic device and the second magnetic device interact under a predominantly repulsive force.

7. The latch of claim 6, wherein when the actuator bracket is in the second position: (i) a first portion of the first magnetic device having a first polarity is aligned with a second portion of the second magnetic device having a second polarity opposite the first polarity, and (ii) a second portion of the first magnetic device having the second polarity is aligned with a first portion of the second magnetic device having the first polarity.

8. The latch of claim 3, wherein the second portion of the IHS includes a kickstand.

9. The latch of claim 8, wherein the actuator bracket is operated in response to physical contact of the button with a surface perpendicular to the first portion.

10. The latch of claim 3, wherein the second portion of the IHS is coupled to the first portion via a spring-loaded hinge.

11. The latch of claim 3, wherein the first portion of the IHS includes one or more clamping magnets, and wherein the second portion of the IHS includes a corresponding set of one or more clamping magnets.

12. The latch of claim 11, wherein when the first magnetic device is in a first position, forces applied to the second portion by the spring-loaded hinge are smaller than a sum of: (i) attractive forces between the first and second magnetic devices, and (ii) attractive forces between the clamping magnets, wherein when the first magnetic device is in a second position, the attractive forces between the clamping magnets are equal to a sum of: (i) the forces applied to the second portion by the spring-loaded hinge, and (ii) repulsive forces between the first and second magnetic devices, and wherein when the first magnetic device is in a third position, the attractive forces between the clamping magnets is smaller than a sum of: (i) repulsive forces between the first and second magnetic devices, and (ii) the forces applied to the second portion by the spring-loaded hinge.

13. The latch of claim 1, wherein the second distance is zero.

14. The latch of claim 1, wherein at least one of the first or second magnetic devices includes an electromagnetic coil.

15. A carrier, comprising:
an actuator bracket having a button configured to translate a second magnet movably coupled to an Information Handling System (IHS) with respect to a first magnetic device fixedly coupled to a kickstand, wherein the actuator bracket further comprises: at an orifice configured to engage with a guidepost, and a detent configured to engage with a stopping pin; and a compression bracket fixedly coupled to the IHS, wherein the compression bracket further comprises: a surface configured to accommodate the second magnet, the guidepost, and the stopping pin, wherein the guidepost is configured to receive a return spring.

16. The carrier of claim 15, wherein the first magnet and the second magnet have a same polarity orientation, wherein the first magnet translates in response to operation of the button.

17. The carrier of claim 16, wherein when the actuator bracket is in a first position, a first portion of the first magnet having a first polarity is aligned with a first portion of the second magnet having a second polarity opposite the first polarity, and the first magnet and the second magnet interact under a predominantly attractive force.

18. The carrier of claim 16, wherein when the actuator is in a second position: (i) a first portion of the first magnet having a first polarity is aligned with a second portion of the second magnet having a second polarity opposite the first polarity, (ii) a second portion of the first magnet having the second polarity is aligned with a first portion of the second magnet having the first polarity, and (iii) the first magnet and the second magnet interact under a predominantly repulsive force.

19. A method, comprising:

operating an actuator of a carrier coupled to a chassis of an Information Handling System (IHS), wherein the carrier holds a first magnet that is movable relative to the chassis by operation of the actuator; and supporting at least a portion of the IHS using a kickstand coupled to the chassis, wherein the kickstand holds a second magnet fixed relative to the kickstand, wherein the chassis includes one or more clamping magnets and the kickstand includes a corresponding set of one or more clamping magnets, wherein when the first magnet is in a first position, forces applied to the kickstand by a spring-loaded hinge coupling the kickstand to the chassis are smaller than a sum of: (i) attractive forces between the first and second magnets, and (ii) attractive forces between the clamping magnets, wherein when the first magnet is in a second position, the attractive forces between the clamping magnets are equal to a sum of: (i) the forces applied to the kickstand by the spring-loaded hinge, and (ii) repulsive forces between the first and second magnets, and wherein when the first magnet is in a third position, the attractive forces between the clamping magnets is smaller than a sum of: (i) repulsive forces between the first and second magnets, and (ii) the forces applied to the kickstand by the spring-loaded hinge.

* * * * *